April 7, 1931. F. FRITSCH 1,799,894
AUTOMOBILE BUMPER
Filed Nov. 17, 1930
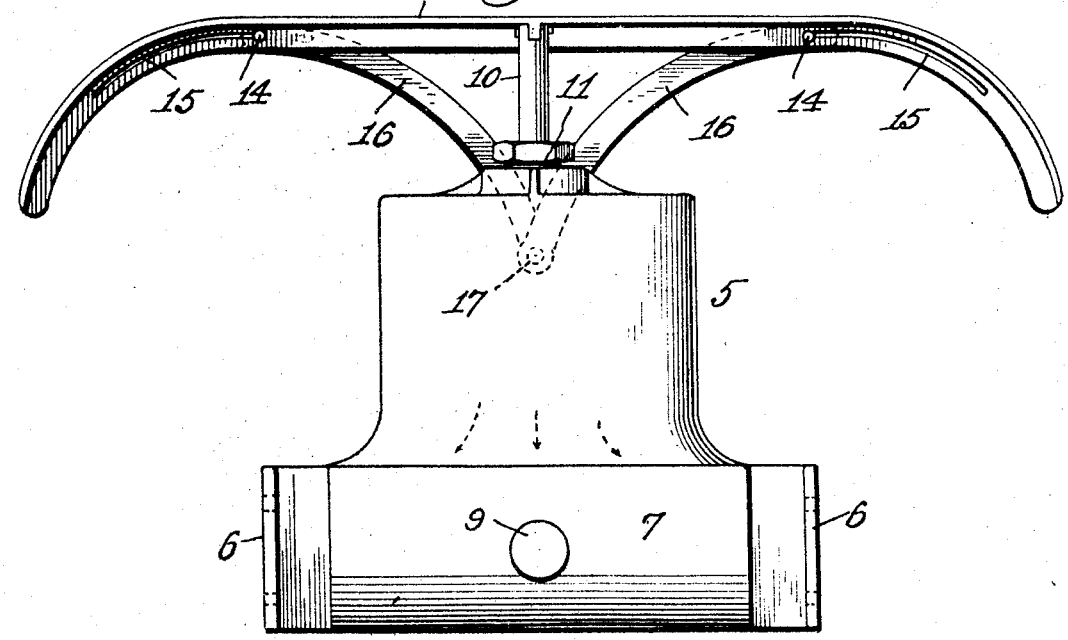
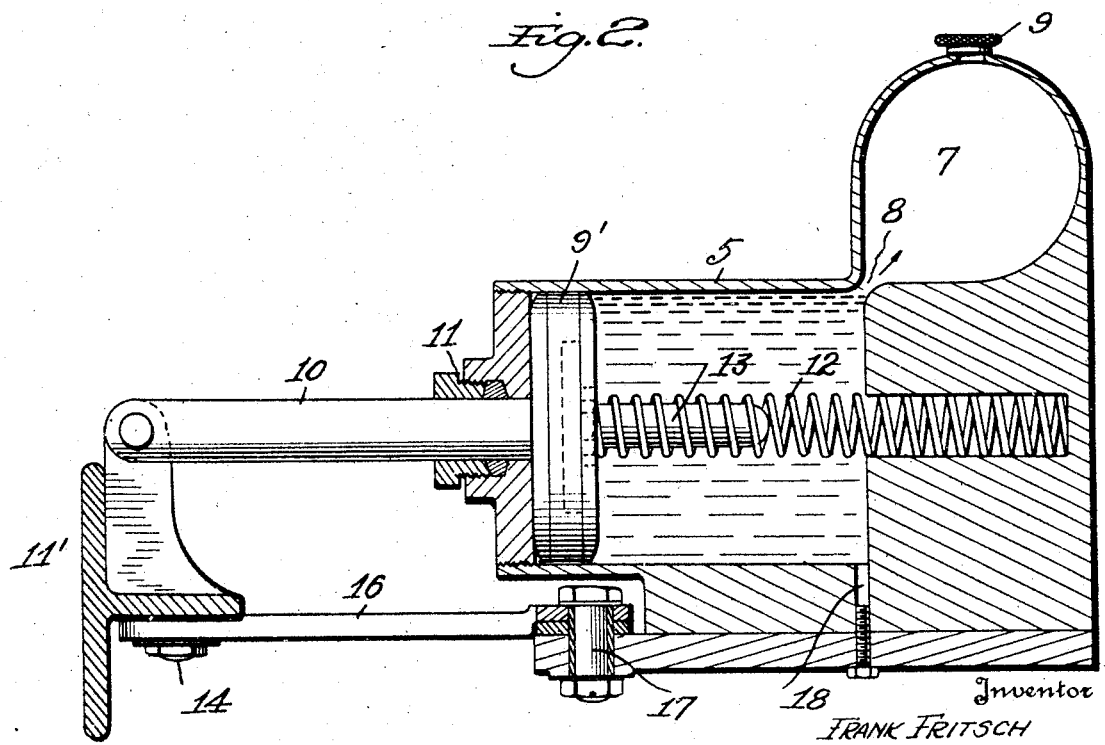
Inventor
FRANK FRITSCH
By Davis & Davis
Attorneys Patented Apr. 7, 1931

1,799,894

UNITED STATES PATENT OFFICE

FRANK FRITSCH, OF DETROIT, MICHIGAN

AUTOMOBILE BUMPER

Application filed November 17, 1930. Serial No. 496,281.

This invention relates to that type of bumper in which the shock is taken up mostly by a fluid such as oil which the shock forces from a main cylinder or chamber through a restricted passage into a relief chamber, a spring being employed to not only assist in resisting the shock but also to return the expelling piston to normal position, as more fully hereinafter set forth.

In the accompanying drawings, Fig. 1 is a plan view of my device; and

Fig. 2 is a vertical longitudinal sectional view thereof.

Referring to the drawings annexed by reference characters, 5 designates a cylinder which is provided with flanges 6 or other means at its rear end for convenience in attaching it to a convenient part of the automobile structure. Extending across the rear end of this cylinder, at its upper side, is a relief chamber 7 which is connected to the rear end of the cylinder by a restricted throat-like passage 8 and which is provided with a removable filling cap 9 to enable the oil or other fluid to be poured, from time to time, into the relief chamber, whence it flows by gravity into the cylinder 5.

Working in the cylinder 5 is a piston 9' whose piston-rod 10 extends through stuffing box 11 in the outer head of the cylinder and is pivotally or otherwise connected at its outer end to a bumper bar 11'. The cylinder is normally pressed forwardly, against the outer end of the cylinder by means of an expansible spiral spring 13 whose rear end is housed in a socket formed in the rear head of the cylinder and whose forward portion surrounds a rearwardly extending rod 13 carried by the piston and adapted, when the piston is pushed backwardly by a bump on the bumper bar, to enter the pocket in the rear head of the cylinder.

The ends of the bumper bar 11' curve outwardly and rearwardly and are each provided with an arcuate slot 15 in which is adapted to slide a vertical pin 14 carried on the end of a curved bar 16, the pins 14 being provided with anti-friction sleeves if desirable. The two bars 16 curve inwardly and backwardly at their inner ends and are pivotally connected together and to the cylinder, at a point centrally under the cylinder, by a pivot 17.

With the forgoing structure, it will be observed that when pressure is exerted on the bumper bar 11' or either one of its extensions 16, the piston will be forced backwardly and thus the oil or other fluid in the piston will be caused to flow upwardly through the throat 8 into the relief chamber 7. The resistance of the spring 12 and the resistance offered by the restricted passage 8 will determine the total resistance offered by the piston. After the pressure on the bumper bar is removed the spring 12 will tend to force the piston back to normal, forward position, and the oil will then by gravity run back from the relief chamber into the cylinder, putting the apparatus in condition for another bump. The curved bars 16 insure an even forward and backward movement of the piston and its rod as the pins 14 are free to slide back and forth in the arcute slots 15. A drainport 18 may be provided for the cylinder for the purpose of changing the oil to suit the seasons. It will of course be understood that this bumper is adapted for use at the rear or at the front of the car.

I claim:

1. A bumper for automobiles consisting of a hydraulic cylinder having a piston-rod extending through its forward head, a bumper bar associated with the projecting end of the piston-rod, a spring for normally forcing the piston forwardly in its cylinder, and a relief chamber connected to the rear end of the cylinder by means of a restricted throat passage, said relief chamber being arranged above the cylinder so that as the spring forces the piston forwardly to normal position the liquid will gravitate back into the cylinder.

2. A bumper of the class set forth embodying a cylinder, a piston therein having a piston-rod projecting through the forward head of the cylinder, resilient means for resisting the backward movement of the piston and for returning it to the normal position, a bumper bar associated with the forward end of the piston-rod, and a pair of curved bars pivotally connected to the cylinder structure at their inner rear ends and curving forwardly and outwardly, said curved bars at the outer ends and the bumper-bar being connected together by a pin and slot arrangement.

3. A bumper for automobiles consisting of a cylinder having a piston-rod extending through its forward head, a bumper bar associated with the projecting end of the piston-rod, a spring for normaly forcing the piston forwardly in its cylinder, and a relief chamber connected to the rear end of the cylinder by means of a restricted throat passage, and a pair of curved bars having a pin and slot connection at their outer ends with the bumper bar and having their inner ends curving rearwardly and pivotally connected together and to the adjacent structure.

In testimony whereof I hereunto affix my signature.

FRANK FRITSCH.